(12) United States Patent
Uejima et al.

(10) Patent No.: US 8,401,492 B2
(45) Date of Patent: Mar. 19, 2013

(54) HIGH FREQUENCY SWITCH MODULE

(75) Inventors: Takanori Uejima, Moriyama (JP);
Hisanori Murase, Otsu (JP); Ken Tonegawa, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 185 days.

(21) Appl. No.: 12/786,677

(22) Filed: May 25, 2010

(65) Prior Publication Data
US 2010/0304693 A1    Dec. 2, 2010

(30) Foreign Application Priority Data

May 26, 2009  (JP) ................................. 2009-125922
Sep. 29, 2009  (JP) ................................. 2009-225536
Apr. 5, 2010  (JP) ................................. 2010-086853

(51) Int. Cl.
*H04B 1/38* (2006.01)
*H04B 1/44* (2006.01)
*H04B 1/28* (2006.01)

(52) U.S. Cl. .............................. 455/73; 455/83; 455/333

(58) Field of Classification Search .................. 455/553, 455/79–83, 307, 553.1, 562.1; 333/132, 333/101, 126, 143, 193, 204; 370/339, 295; 326/30

See application file for complete search history.

(56) References Cited

U.S. PATENT DOCUMENTS

| | | | | |
|---|---|---|---|---|
| 7,183,875 B2 * | 2/2007 | Muto et al. | ...................... | 333/103 |
| 7,253,702 B2 * | 8/2007 | Kemmochi et al. | ........... | 333/133 |
| 2002/0145443 A1 * | 10/2002 | Partow et al. | .................... | 326/30 |
| 2004/0048634 A1 | 3/2004 | Satoh et al. | | |
| 2004/0127182 A1 * | 7/2004 | Hayashi | ...................... | 455/193.1 |
| 2004/0171356 A1 * | 9/2004 | Uriu et al. | ........................ | 455/83 |
| 2006/0276158 A1 * | 12/2006 | Okabe | ........................... | 455/333 |
| 2007/0216441 A1 * | 9/2007 | Nemoto et al. | .................. | 326/30 |
| 2008/0266199 A1 | 10/2008 | Milosavljevic et al. | | |
| 2009/0017772 A1 * | 1/2009 | Kemmochi et al. | ............. | 455/73 |
| 2010/0182097 A1 * | 7/2010 | Hayashi et al. | ................. | 333/32 |

FOREIGN PATENT DOCUMENTS

| | | |
|---|---|---|
| EP | 1 083 672 A1 | 3/2001 |
| EP | 1 427 114 A9 | 6/2004 |
| EP | 1 720 261 A1 | 11/2006 |
| JP | 2001-352269 A | 12/2001 |
| JP | 2002-64301 A | 2/2002 |

(Continued)

OTHER PUBLICATIONS

Official Communication issued in corresponding German Patent Application No. 10 2010 029 156.0, mailed on Dec. 7, 2012.

*Primary Examiner* — Andrew Wendell
*Assistant Examiner* — Cindy Trandai
(74) *Attorney, Agent, or Firm* — Keating & Bennett, LLP (57) ABSTRACT

A high frequency switch module includes a laminated circuit component that includes an antenna electrode connected to a single antenna, a plurality of communication electrodes connected to a plurality of high frequency communication circuits to transmit, receive, or transmit and receive plural kinds of communication signals, and a land arranged to mount a switch IC on, and a switch IC that is mounted on the laminated circuit component and includes a common terminal connected to the single antenna through the laminated circuit component, and a plurality of communication circuit terminals connected to the plurality of high frequency communication circuits through the laminated circuit component. The switch IC is provided with switch circuits between the communication circuit terminals and the common terminal, and all of the switch circuits have the same or substantially the same resistance against transmission power applied at the time of transmission.

10 Claims, 6 Drawing Sheets

FOREIGN PATENT DOCUMENTS

| | | |
|---|---|---|
| JP | 2003-87150 A | 3/2003 |
| JP | 2004-235937 A | 8/2004 |
| JP | 2004-297717 A | 10/2004 |
| JP | 2008-124790 A | 5/2008 |
| JP | 2009-5399 A | 1/2009 |
| JP | 3147878 U | 1/2009 |

* cited by examiner

FIG. 6 ary of the Present Invention

HIGH FREQUENCY SWITCH MODULE

BACKGROUND OF THE PRESENT INVENTION

1. Field of the present invention

The present invention relates to a high frequency switch module that switches a plurality of kinds of high frequency signals to transmit and receive the signals.

2. Description of the Related Art

High frequency switch modules have been variously designed to transmit and receive a plurality of communication signals with individual frequency bands using one antenna. For example, in Japanese Unexamined Patent Application Publication No. 2003-87150, a high frequency composite switch module is disclosed which includes an SPnT type (n is a positive number) switch IC and a laminated body on which the switch IC is mounted.

As such high frequency switch modules are used for radio communication apparatuses, such as mobile phones, it is necessary to increase the power of the transmission signal in such an apparatus. Thus, it is necessary to increase the power resistance of a circuit on the transmission side. Since the reception signal received by an antenna has a signal level less than that of the transmission signal, it is not necessary to increase the power resistance as much as the circuit on the transmission side. For a communication system, there are cases in which a terminal for both transmission and reception is used. However, in such cases, the power resistance as high as a circuit on the transmission side used only for transmission is not necessary.

For this reason, in the existing switch IC, a transmission switch circuit connecting an antenna terminal (common terminal) and a transmission terminal to each other, a reception switch circuit connecting an antenna terminal (common terminal) and a reception terminal to each other, and a transmission and reception switch circuit for transmission and reception have different structures, according to specifications of radio communication apparatuses, such as mobile phones. With such a configuration, an external connection terminal of the switch IC is predetermined to be used with any one of the antenna terminal (common terminal), the transmission terminal, the reception terminal, and the transmission and reception terminal.

Recently, as mobile phones get smaller, it is necessary to reduce the size of high frequency switch modules. Meanwhile, mobile phones must be provided with a multi-band system, to cope with various communication systems such as GSM, WCDMA, and UMTS, and have to be provided with a transmission terminal and a reception terminal, or a transmission and reception terminal for all of the communication systems, according to specifications.

For this reason, the design and production of a switch IC are individually performed whenever specifications are changed, and thus, high costs and large amounts of time have been required. In addition, for the laminated body on which the switch IC is mounted, changes in the design of the mounting surface, accompanying changes in the design of internal structure thereof, and production of the laminated body based on such changes in the design must be performed as the switch IC changes. High costs and large amounts of time have been expended on these factors.

SUMMARY OF THE PRESENT INVENTION

To overcome the problems described above, preferred embodiments of the present invention provide a high frequency switch module in which the cost and time required for design and production of the switch IC is greatly reduced, and the cost and time required for the design and production of the laminated body on which the switch IC is mounted is also drastically reduced, even when there are various specifications of radio communication apparatuses, such as mobile phones, provided with the high frequency switch module.

According to a preferred embodiment of the present invention, a high frequency switch module is provided which includes a laminated circuit component that is provided with an antenna electrode connected to a single antenna, and a plurality of communication electrodes connected to a plurality of high frequency communication circuits to transmit, receive, or transmit and receive a plurality of kinds of communication signals, and is provided with a land arranged to mount a switch IC on, and a switch IC that is mounted on the laminated circuit component and is provided with a common terminal connected to the antenna through the laminated circuit component, and a plurality of communication circuit terminals connected to the plurality of high frequency communication circuits through the laminated circuit component. The switch IC of the high frequency switch module is provided with switch circuits between the communication circuit terminals and the common terminal, and all of the switch circuits preferably have the same or substantially the same resistance against transmission power applied at the time of transmission.

In this configuration, since all of the switch circuits can transmit transmission signals, the same switch IC can be used for communication systems having different specifications.

The switch circuit circuits of the switch IC of the high frequency switch module according to this preferred embodiment of the present invention preferably include semiconductor switch elements connected to a plurality of stages, and the number of stages of the semiconductor switch elements of all of the switch circuits are preferably the same.

In this configuration, the specific structure of the switch IC is described. Since the number of stages of the semiconductor switch elements of all of the switch circuits are the same, all of the switch circuits can transmit transmission signals, thereby providing the structure of the switch IC.

In the high frequency switch module according to a preferred embodiment of the present invention, the communication circuit terminals including a plurality of transmission and reception terminals and reception-only terminals are preferably arranged at an outside edge on one main surface of the switch IC. In addition, the transmission and reception terminals and the reception-only terminals are preferably alternately provided in the arrangement direction.

In this configuration, the plurality of the transmission and reception terminals are not close to each other, and thus, it is possible to improve the isolation between the transmission and reception terminals.

The laminated circuit component of the high frequency switch module according to a preferred embodiment of the present invention is preferably provided with a phase adjustment circuit including an inductor defined by discrete components mounted on the laminated circuit component or electrode patterns provided between laminated insulating layers, and the phase adjustment circuit is provided between the antenna electrode and the common terminal.

In this configuration, the specific internal circuit configuration of the laminated circuit component (laminated body) on which the switch IC is mounted is described. Since the phase adjustment circuit is provided between the antenna electrode of the laminated circuit component and the common terminal land electrode of the switch IC, phases can be adjusted for transmission signals, reception signals, and transmission and reception signals of all of the communication systems handled by the high frequency switch module even when the switch IC is used. In addition, alignment of transmission lines is improved so as to reduce transmission loss.

The high frequency switch module according to a preferred embodiment of the present invention preferably further includes an inductor having one end connected to the common terminal and the other end connected to a ground electrode.

In this configuration, since the ground is connected to the terminal of the switch IC only through the inductor, the electric charges accumulated in the switch IC are rapidly discharged to the ground through the inductor.

The inductor defining the phase adjustment circuit of the high frequency switch module according to a preferred embodiment of the present invention preferably includes a series inductor serially connected between the antenna electrode and the common terminal, and a shunt inductor having one end connected to the common terminal on the common terminal side of the series inductor and the other end connected to the ground electrode.

In this configuration, since the shunt inductor defining the phase adjustment circuit directly connects the switch IC to the ground, the electric charges accumulated in the switch IC are rapidly discharged through the shunt inductor. Accordingly, the phase adjustment circuit provides the phase adjustment function and a function of rapidly discharging static electricity (function as an ESD protection device).

The switch IC of the high frequency switch module according to a preferred embodiment of the present invention is preferably defined by a rectangular parallelepiped which is rectangular in the plan view, for example. The plurality of communication circuit terminals are arranged close to one side other than the side at which the common terminal of the switch IC is provided.

In this configuration, the specific configuration of the terminals of the switch IC is described. With such a configuration, isolation is ensured between the communication circuit terminals used to input and output transmission signals, reception signals, and transmission and reception signals, and the common terminal used for transmission and reception to the antenna.

The switch IC of the high frequency switch module according to a preferred embodiment of the present invention is preferably provided with a driving power supply terminal arranged to supply electric power, and the driving power supply terminal is arranged close to one side other than the side at which the plurality of communication circuit terminals of the switch IC are provided.

In this configuration, the specific configuration of the terminals of the switch IC is also described. With such a configuration, isolation is ensured between the communication circuit terminals used to input and output transmission signals, reception signals, and transmission and reception signals, and the driving power supply terminal.

The laminated circuit component of the high frequency switch module according to a preferred embodiments of the present invention is preferably provided with a plurality of connection circuits that electrically connect the communication circuit terminals of the switch IC to the communication electrodes to be connected to the communication circuit terminal by a via-hole extending through the insulating layers and the circuit electrode patterns arranged between the laminated insulating layers, and the plurality of connection circuits preferably have the same or substantially the same electrical length.

In this configuration, the specific internal circuit configuration of the laminated circuit component (laminated body) on which the switch IC is mounted is described. Since the connection circuits between the communication circuit terminals of the switch IC and the communication electrodes connected to the communication circuit terminals have the same or substantially the same electrical length, it is possible to obtain the same or substantially the same transmission characteristics in a case in which the same communication signal regardless of which terminal is selected.

The laminated circuit component of the high frequency switch module according to a preferred embodiment of the present invention is provided with a plurality of connection circuits that electrically connect the communication circuit terminals of the switch IC to the communication electrodes to be connected to the communication circuit terminal by a via-hole extending through the insulating layers and the circuit electrode patterns arranged between the laminated insulating layers, a filter circuit with a predetermined pass band is provided in a specific connection circuit of the connection circuits, and the filter circuit includes an inductor and a capacitor formed of electrode patterns arranged between the laminated insulating layers or discrete components mounted on the laminated circuit component.

In this configuration, it is possible to provide a filter circuit using discrete components mounted on the laminated circuit component or the internal electrode of the laminated circuit component as necessary with such a configuration. Accordingly, when the transmission path through the filter circuit is selected to be the transmission path of the transmission signal, it is possible to attenuate the harmonics of the transmission signal deriving from the transmission signal generating side to a greater extent than the high frequency switch module by the high frequency switch module. In this case, since the terminal structure of the switch IC described above is used, it is possible to improve the degree of freedom in design of the internal electrode patterns of the laminated circuit component defining the filter circuit. That is, even in the case of the high frequency switch module having excellent harmonic characteristics, it is possible to improve the degree of freedom in design.

According to various preferred embodiments of the present invention, the high frequency switch module can be defined by one kind of switch IC for a plurality of communication system with different specifications. Accordingly, it is not necessary to design a new switch IC for each specification, and it is possible to simplify the design of the laminated body. Therefore, it is possible to reduce the cost and time required to produce the high frequency switch module for the plurality of communication systems, and it is possible to efficiently design and produce a plurality of kinds of high frequency switch modules.

The above and other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1A:
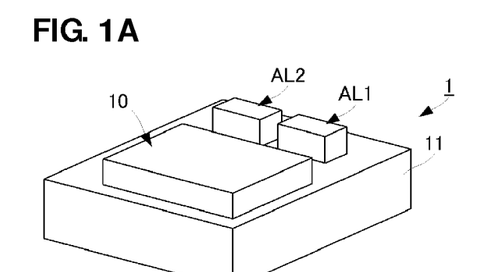
FIG. 1A is a perspective view illustrating an external appearance of a high frequency switch module according to a first preferred embodiment of the present invention.
Figure 1B:
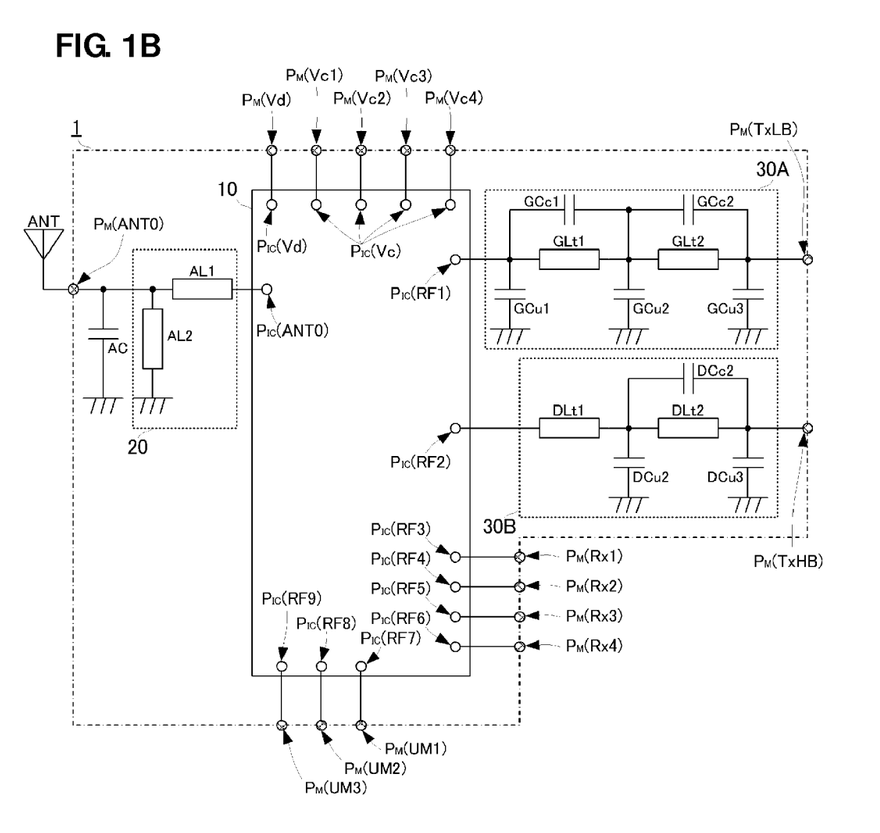
FIG. 1B is a block diagram illustrating a circuit configuration of the high frequency switch module according to the first preferred embodiment of the present invention.

A high frequency switch module according to a first preferred embodiment of the present invention will be described with reference to the drawings. FIG. 1A is a perspective view illustrating an external appearance of a high frequency switch module 1 and FIG. 1B is a block diagram illustrating a circuit configuration of the high frequency switch module 1 according to the first preferred embodiment.

Figure 2A:
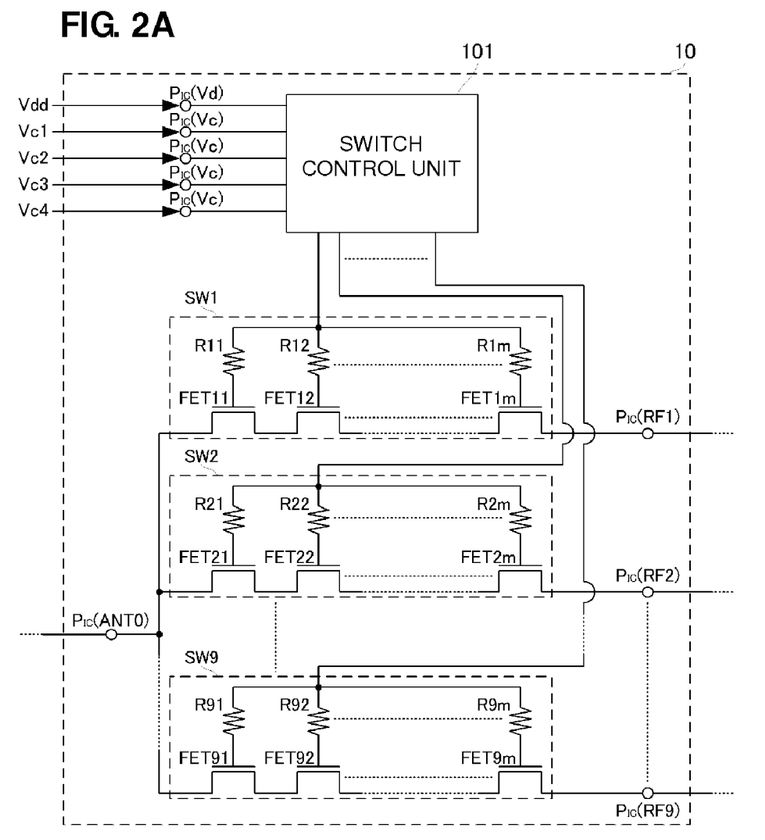
FIG. 2A is a diagram illustrating an internal circuit configuration of a switch IC according to the first preferred embodiment of the present invention.
Figure 2B:
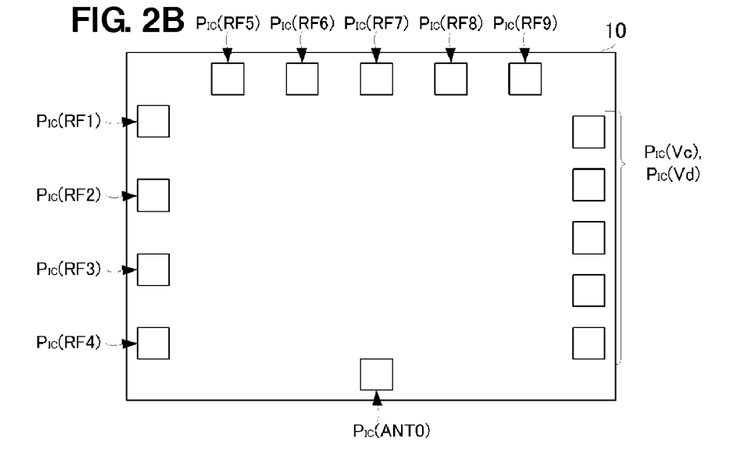
FIG. 2B is a diagram illustrating disposition of ports of the switch IC according to the first preferred embodiment of the present invention.
Figure 3:
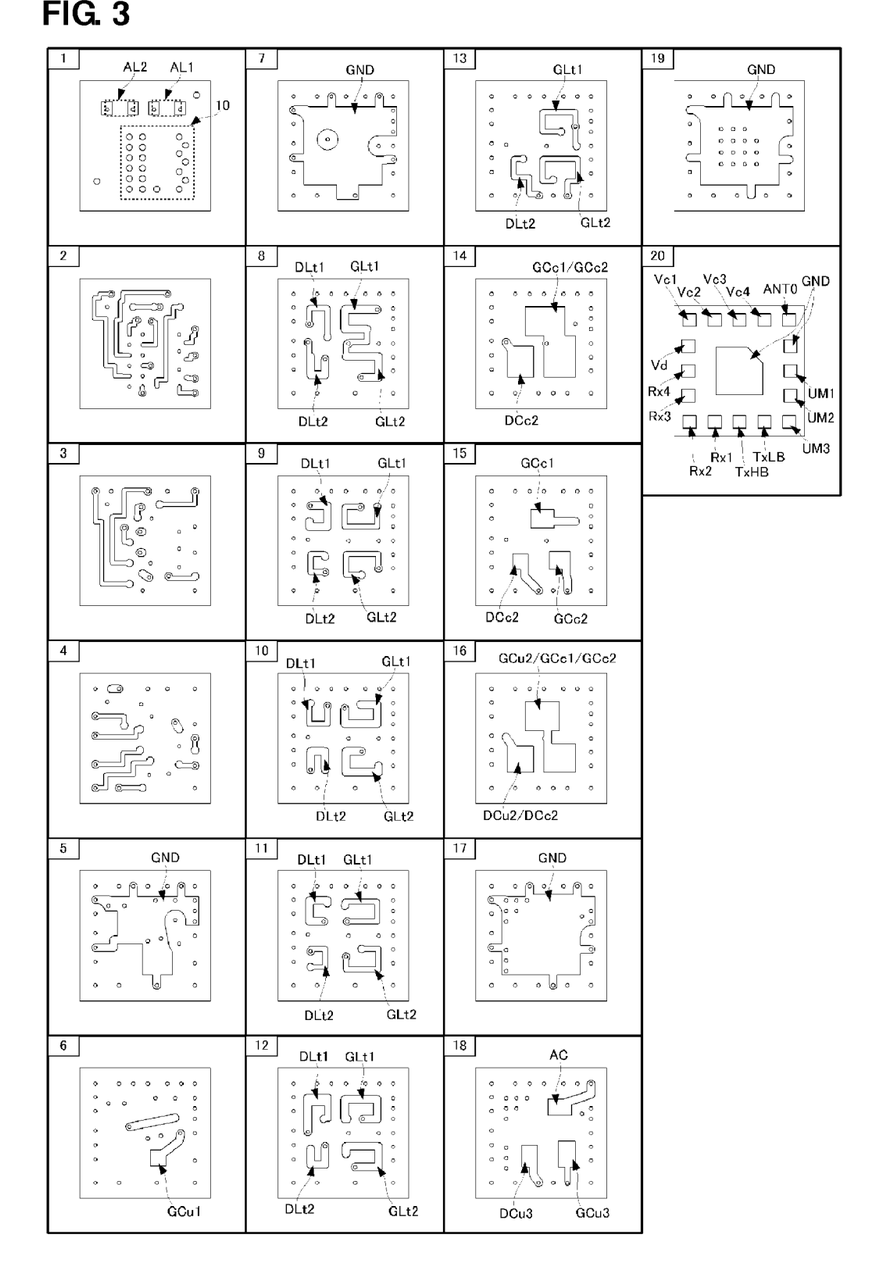
FIG. 3 is a lamination diagram illustrating a laminated circuit component according to the first preferred embodiment of the present invention.

FIG. 2A is a diagram illustrating an internal circuit configuration of a switch IC 10 and FIG. 2B is a diagram illustrating disposition of ports. FIG. 3 is a lamination diagram illustrating a laminated circuit component 11.

As shown in FIG. 1A, the high frequency switch module 1 is provided with a laminated circuit component 11 preferably having an external shape of a substantially rectangular parallelepiped, for example, a switch IC 10 mounted on the top surface of the laminated circuit component 11, and inductors AL1 and AL2 as discrete components mounted on the top surface of the laminated circuit component 11.

Although the specific configuration of the laminated circuit component 11 will be described later with reference to FIG. 3, briefly, the laminated circuit component 11 preferably includes a laminated body formed by laminating a plurality of organic layers, such as ceramic and resin, for example. The laminated circuit component 11 is provided with circuit patterns as shown in FIG. 1B by forming electrodes in the inner layer between the organic layers and on the top surface and bottom surface of the laminated body with predetermined patterns, other than the switch IC 10 and the inductors AL1 and AL2 of the high frequency switch module 1.

As shown in FIG. 1B, the high frequency switch module 1 is provided with low pass filters 30A and 30B corresponding to the "filter circuit" of preferred embodiments of the present invention and an antenna capacitor AC, as well as the switch IC 10 and the phase adjustment circuit 20 formed of the inductors AL1 and AL2.

The high frequency switch module 1 is provided with a plurality of external connection electrodes $P_M$. The plurality of external connection electrodes $P_M$ is used to be mounted on a circuit board of a rear end circuit on which the high frequency switch module 1 is mounted. In the following description, for convenience of description, the external connection electrodes $P_M$ of the high frequency switch module 1 are called "electrodes", and mounting electrodes $P_{IC}$ of the switch IC 10 are called "ports".

The plurality of external connection electrodes $P_M$ includes an antenna external electrode $P_M(ANT0)$ corresponding to an "antenna electrode", transmission external electrodes $P_M(TxLB)$ and $P_M(TxHB)$ corresponding to a "communication electrode", reception external electrodes $P_M(Rx1)$, $P_M(Rx2)$, $P_M(Rx3)$, and $P_M(Rx4)$, transmission and reception external electrodes $P_M(UM1)$, $P_M(UM2)$, and $P_M(UM3)$, a driving voltage input external electrode $P_M(Vd)$ arranged to input a driving voltage, and a control voltage input external electrode $P_M(Vc1)$, $P_M(Vc2)$, $P_M(Vc3)$, and $P_M(Vc4)$ arranged to input a control voltage signal. Although not shown in FIG. 1A, a ground electrode is also provided.

The antenna external electrode $P_M(ANT0)$ connected to an antenna ANT is connected to the antenna port $P_{IC}(ANT0)$ of the switch IC 10 through the phase adjustment circuit 20.

The phase adjustment circuit 20 includes the inductors AL1 and AL2, and the inductor AL1 is serially connected between the antenna external electrode $P_M(ANT0)$ and the antenna port $P_{IC}(ANT0)$. The inductor AL2 is connected between the side of the inductor AL1 close to the antenna external electrode $P_M(ANT0)$ and the ground. The antenna capacitor AC is connected between the side of the inductor AL1 close to the antenna external electrode $P_M(ANT0)$ and the ground.

The transmission external electrode $P_M(TxLB)$ of the high frequency switch module 1 is connected to the communication port $P_{IC}(RF1)$ of the switch IC 10 through the low pass filter 30A.

The low pass filter 30A includes inductors GLt1 and GLt2, and capacitor GCu1, GCu2, GCu3, GCc1, and GCc2.

The inductors GLt1 and GLt2 are serially connected between the transmission external electrode $P_M(TxLB)$ and the communication port $P_{IC}(RF1)$. The inductor GLt1 is connected in parallel to the capacitor GCc1, and the inductor GLt2 is connected in parallel to the capacitor GCc2. The capacitor GCu1 is connected between the side of the inductor GLt1 close to the communication port $P_{IC}(RF1)$ and the ground. The capacitor GCu2 is connected between the connection point of the inductors GLt1 and GLt2 and the ground. The capacitor GCu3 is connected between the side of the inductor GLt2 close to the transmission external electrode $P_M(TxLB)$ and the ground.

The values of the inductors and capacitors defining the low pass filter 30A are set to pass through a frequency band of the transmission signal input from the transmission external electrode $P_M(TxLB)$ and to attenuate a harmonic band of the transmission signal. For example, a frequency band of the transmission signal of GSM850 or GSM900 is preferably set as the pass band, and a band of double harmonic and triple harmonic is preferably set as an attenuation band.

The transmission external electrode $P_M(TxHB)$ of the high frequency switch module 1 is connected to the communication port $P_{IC}(RF2)$ of the switch IC 10 through the low pass filter 30B.

The low pass filter 30B includes inductors DLt1 and DLt2 and capacitors DCu2, DCu3, and DCc2.

The inductors DLt1 and DLt2 are serially connected between the transmission external electrode $P_M(TxHB)$ and the communication port $P_{IC}(RF2)$. The inductor DLt2 is connected in parallel to the capacitor DCc2. The capacitor DCu2 is connected between the connection point of the inductors DLt1 and DLt2 and the ground. The capacitor DCu3 is connected between the side of the inductor DLt2 close to the transmission external electrode $P_M(TxHB)$ and the ground.

The values of the inductors and capacitors defining the low pass filter 30B are set to pass through a frequency band of the transmission signal input from the transmission external electrode $P_M$ (TxHB) and to attenuate a harmonic band of the transmission signal. For example, a frequency band of the transmission signal of GSM1800 or GSM1900 is preferably set as the pass band, and a band of double harmonic and triple harmonic is preferably set as an attenuation band.

The reception external electrodes $P_M$ (Rx1), $P_M$ (Rx2), $P_M$ (Rx3), and $P_M$ (Rx4) of the high frequency switch module 1 are connected to the communication ports $P_{IC}$ (RF3), $P_{IC}$ (RF4), $P_{IC}$ (RF5), and $P_{IC}$ (RF6) of the switch IC 10, respectively. The reception external electrodes $P_M$ (Rx1), $P_M$ (Rx2), $P_M$ (Rx3), and $P_M$ (Rx4) are connected to a reception circuit (not shown) for communication signals. For example, the reception external electrodes $P_M$ (Rx1), $P_M$ (Rx2), $P_M$ (Rx3), and $P_M$ (Rx4) are preferably connected to a reception circuit for GSM850, GSM900, GSM1800, and GSM1900.

The transmission and reception external electrodes $P_M$ (UM1), $P_M$ (UM2), and $P_M$ (UM3) of the high frequency switch module 1 are connected to the communication ports $P_{IC}$ (RF7), $P_{IC}$ (RF8), and $P_{IC}$ (RF9) of the switch IC 10, respectively. The transmission and reception external electrodes $P_M$ (UM1), $P_M$ (UM2), and $P_M$ (UM3) are connected to transmission and reception circuits (not shown) for communication signals. For example, the transmission and reception external electrodes $P_M$ (UM1), $P_M$ (UM2), and $P_M$ (UM3) are preferably connected to the transmission and reception circuits for UMTS and the transmission and reception circuit for WCDMA.

The driving voltage input external electrode $P_M$ (Vd) of the high frequency switch module 1 is connected to the driving voltage input port $P_{IC}$ (Vd) of the switch IC 10.

The control voltage input external electrodes $P_M$ (Vc1), $P_M$ (Vc2), $P_M$ (Vc3), and $P_M$ (Vc4) of the high frequency switch module 1 are connected to the control voltage input ports $P_{IC}$ (Vc1), $P_{IC}$ (Vc2), $P_{IC}$ (Vc3), and $P_{IC}$ (Vc4) of the switch IC 10, respectively.

The switch IC 10 is an SP9T-type FET switch IC having a substantially rectangular shape in the plan view, is driven by a driving voltage Vdd, and has a function of selectively connecting any one of the communication ports $P_{IC}$ (RF1) to $P_{IC}$ (RF9) corresponding to a "communication circuit terminal", to the antenna port $P_{IC}$ (ANT0) corresponding to a "common terminal", according to the combination of the control voltage signals Vc1 to Vc4. In this preferred embodiment, the SP9T type is exemplified, but the configuration of this preferred embodiment of the present invention can be applied to an SPnT type (n is a positive number of 2 or more).

The switch IC 10 has a configuration shown in FIG. 2A, and is provided with a switch control unit 101 and FET switch circuits SW1 to SW9.

The switch control unit 101 is driven by the driving voltage Vdd input from the driving voltage input port $P_{IC}$ (Vd), controls any one of the FET switch circuits SW1 to SW9 to turn on according to the combination of the driving voltages Vc1 to Vc4 input from the control voltage input ports $P_{IC}$ (Vc1), $P_{IC}$ (Vc2), $P_{IC}$ (Vc3), and $P_{IC}$ (Vc4), generates a switch control signal to control the others to turn off, and transmits the signal to the FET switch circuits SW1 to SW9.

The switch circuit SW1 is connected between the antenna port $P_{IC}$ (ANT0) and the communication port $P_{IC}$ (RF1), and the switch circuit SW2 is connected between the antenna port $P_{IC}$ (ANT0) and the communication port $P_{IC}$ (RF2). Similarly, the switch circuit SWk (k=3 to 9) is connected between the antenna port $P_{IC}$ (ANT0) and the communication port $P_{IC}$ (RFk).

The switch circuits SW1 to SW9 preferably have the same or substantially the same structure. Herein, the configuration of the switch circuit SW1 is described as an example of the switch circuits SW1 to SW9.

The switch circuit SW1 includes a plurality of FET 11 to FET 1m (m is a positive number of 2 or more), and the FET 11 to FET 1m are continuously connected between the antenna port $P_{IC}$ (ANT0) and the communication ports $P_{IC}$ (RF1). Specifically, the source of the FET 11 is connected to the antenna port $P_{IC}$ (ANT0), and a drain of the FET 11 is connected to a source of the FET 12. The source of the FET 12 to FET 1m is connected to the drain of FET adjacent to the antenna port $P_{IC}$ (ANT0). The drain of the FET 1m is connected to the communication port $P_{IC}$ (RF1).

Gates of the FET 11 to FET 1m are connected to resistors R11 to R1m, and the switch control signals are applied from the switch control unit 101 through the resistors R11 to R1m.

As described above, the switch circuits SW1 to SW9 between the antenna ports $P_{IC}$ (ANT0) and the communication ports $P_{IC}$ (RF1) to $P_{IC}$ (RF9) of the switch IC 10 have the same or substantially the same structure, and thus, it is possible to obtain the same electrical characteristics even when any the communication ports $P_{IC}$ (RF1) to $P_{IC}$ (RF9) is selected.

In this case, since all of the switch circuits SW1 to SW9 are defined by multi-stages of the FET as shown in FIG. 2A, it is possible to increase the permissible amount of transmitted power. Accordingly, the number of stages of the FET is set as the upper limit level of the transmitted power, and all of the communication ports $P_{IC}$ (RF1) to $P_{IC}$ (RF9) can be used for any one of the transmission port, the reception port, and the transmission and reception port. Specifically, the composite communication system with GSM850, GSM900, GSM1800, GSM1900, UMTS, and WCDMA as described above can be used for all of the transmission, reception, and transmission and reception of communication systems with a configuration having a power resistance against 35 dBm which is the GSM transmission level.

Accordingly, since the communication ports $P_{IC}$ (RF1) to $P_{IC}$ (RF9) can be appropriately assigned to any one of transmission, reception, and transmission and reception, it is not necessary to individually design the transmission ports, the reception ports, and the transmission and reception ports for system specifications to produce an IC. As a result, it is possible to drastically reduce the design cost, the design effort, the design time, and the preparation for production of the switch IC.

Next, the arrangement of the ports of the switch IC 10 will be described. Electrodes corresponding to the ports are arranged on the bottom surface of the switch IC 10 as shown in FIG. 2B.

As shown in FIG. 2B, the electrode group of the communication ports $P_{IC}$ (RF1) to $P_{IC}$ (RF9) is arranged along the side other than that of the electrode of antenna port $P_{IC}$ (ANT0) in the switch IC 10. Accordingly, it is possible to improve the isolation between the communication ports $P_{IC}$ (RF1) to $P_{IC}$ (RF9) and the antenna port $P_{IC}$ (ANT0).

The electrode group of the communication ports $P_{IC}$ (RF1) to $P_{IC}$ (RF9) is arranged along a side other than the side on which the electrode group of the driving voltage input port $P_{IC}$ (Vd), and the control voltage input ports $P_{IC}$ (Vc1), $P_{IC}$ (Vc2), $P_{IC}$ (Vc3), and $P_{IC}$ (Vc4) is arranged in the switch IC 10. Accordingly, it is possible to improve the isolation between the communication ports $P_{IC}$ (RF1) to $P_{IC}$ (RF9) and the driving voltage input ports $P_{IC}$ (Vd), and the control voltage input ports $P_{IC}$ (Vc1), $P_{IC}$ (Vc2), $P_{IC}$ (Vc3), and $P_{IC}$ (Vc4).

The electrode of the antenna port $P_{IC}$ (ANT0) is arranged along a side other than the sides on which the electrode group of the driving voltage input port $P_{IC}$ (Vd) and the control voltage input ports $P_{IC}$ (Vc1), $P_{IC}$ (Vc2), $P_{IC}$ (Vc3), and $P_{IC}$ (Vc4) are arranged on switch IC 10. Accordingly, it is possible to improve the isolation between the antenna port $P_{IC}$ (ANT0), and the driving voltage input ports $P_{IC}$ (Vd) and the control voltage input ports $P_{IC}$ (Vc1), $P_{IC}$ (Vc2), $P_{IC}$ (Vc3), and $P_{IC}$ (Vc4).

As described above, the FETs are formed in the multi-stage, and thus, phase variation occurs in the switch circuits SW1 to SW9 equivalent to a serial connection of capacitors. However, as described above, by inserting the phase adjustment circuit 20 including the inductors AL1 and AL2 into the antenna port side, the phase variation occurring in the switch circuits SW1 to SW9 can be corrected by adjustment of the phase adjustment circuit 20, and it is possible to prevent transmission loss from decreasing. In this case, the phase adjustment for each of the switch circuits SW1 to SW9 can be performed with one phase adjustment circuit 20 without installing a phase adjustment circuit for each of the switch circuits SW1 to SW9, by inserting phase adjustment circuit 20 into the antenna port side.

The phase adjustment circuit 20 can change the amount of phase adjustment by simply changing the switching components, using the inductors AL1 and AL2 defined by discrete components. Accordingly, even after the high frequency switch module 1 is completed, it is possible to easily change the amount of phase adjustment, as necessary, and it is possible to obtain the optimal amount of phase adjustment.

Next, the lamination configuration of the laminated circuit component 11 defining the high frequency switch module 1 will be described in more detail with reference to FIG. 3.

As described above, in the laminated circuit component 11, the antenna capacitor AC and the low pass filters 30A and 30B are defined by the internal electrode patterns, and the circuit patterns connecting the antenna capacitor AC, the low pass filters 30A and 30B, the switch IC 10, the phase adjustment circuit 20, the external connection electrode $P_M$, and the ports $P_{IC}$ of the switch IC 10 of the high frequency switch module 1 are defined by the internal electrode patterns or the electrodes on the top surface and bottom surface of the high frequency switch module 1.

The laminated circuit component 11 preferably includes, for example, 20 organic layers that are laminated. FIG. 3 is a lamination diagram in which the top surface of the laminated circuit component 11 is the first layer, the layer numbers increase toward the bottom surface, the bottom surface of the laminated circuit component 11 is the twentieth layer, and the laminated circuit component 11 will be described hereinafter with reference to the layer numbers. In FIG. 3, the circles shown in the layers denote conductive via-holes, and conductivity between the electrodes of the layers arranged in the lamination direction is provided by the via-holes.

The first top surface corresponding to the top surface of the laminated circuit component 11 is provided with a land group for mounting the switch IC 10, and a land group for mounting the inductors AL1 and AL2.

The second, third, and fourth layers are provided with various electrode patterns for leading.

The fifth layer is provided with a ground electrode GND. The ground electrode GND of the fifth layer also functions as an opposite electrode of the capacitor GCu1. The sixth layer is provided with an opposite electrode of the capacitor GCu1. The seventh layer is provided with a ground electrode GND. The ground electrode GND of the seventh electrode also functions as an opposite electrode of the capacitor GCu1.

The eighth, ninth, tenth, eleventh, twelfth, and thirteenth layers are provided with electrode patterns defining the inductors GLt1, GLt2, DLt1, and DLt2.

The fourteenth layer is provided with an opposite electrode of the capacitors GCc1 and GCc2, and an opposite electrode of the capacitor DCc2. The fifteenth layer is provided with opposite electrodes of the capacitors GCc1, GCc2, and DCc2. The sixteenth layer is provided with an opposite electrode of the capacitors GCu2, GCc1, and GCc2, and an opposite electrode of the capacitor DCu2 and DCc2.

The seventeenth layer is provided with a ground electrode GND. The ground electrode GND of the seventeenth layer also functions as an opposite electrode of the capacitors GCu2, DCu2, GCu3, and DCu3.

The eighteenth layer is provided with opposite electrodes of the capacitors GCu3 and DCu3 and the antenna capacitor AC.

The nineteenth layer is provided with a ground electrode GND. The ground electrode GND of the nineteenth layer also functions as an opposite electrode of the capacitors GCu3, DCu3, and the antenna capacitor AC.

The bottom surface of the twentieth layer corresponding to the bottom surface of the laminated circuit component 11 is provided with the external connection electrodes $P_M$.

With this configuration, circuit elements other than the switch IC 10 in the high frequency switch module 1, such as a circuit element defining the low pass filters 30A and 30B and the antenna capacitor AC, for example, can be partially defined by the inner layer electrode of the laminated circuit component 11. Accordingly, it is possible to reduce the size of the high frequency switch module 1. The circuit elements other than the switch IC 10 may preferably be appropriately defined by discrete components, such as the inductors AL1 and AL2. On the other hand, the inductors AL1 and AL2 may be defined by the inner layer electrodes of the laminated circuit component 11.

Also, when designing such a laminated circuit component 11, the communication ports $P_{IC}$ (RF1) to $P_{IC}$ (RF9) of the switch circuit IC 10 have the same or substantially the same electrical characteristics as described above, and the transmission, the reception, and the transmission and reception can be appropriately selected. Accordingly, it is possible to improve the degree of freedom of the mount land patterns of the switch IC 10 and/or the leading patterns of the internal electrodes. With such a configuration, it is possible to reduce the design and production costs and design time of the laminated circuit component 11, that is, the high frequency switch module 1.

Even when the low pass filters 30A and 30B are provided in the laminated circuit component 11 as described above, the degree of freedom in the design of the electrode patterns for the low pass filters 30A and 30B is improved by the degree of freedom of selection of the communication ports $P_{IC}$ (RF1) to $P_{IC}$ (RF9) of the switch IC 10. With such a configuration, even when the high frequency switch module includes the low pass filters 30A and 30B and suppresses the harmonics of transmission signals, it is possible to reduce the design and production costs and the design time.

In the above description, the low pass filters 30A and 30B are preferably included in the laminated circuit component 11 as an example, but the laminated circuit component 11 may not include the low pass filters 30A and 30B. In this case, it is preferable that the internal electrode patterns and the via-holes are arranged such that the electrical lengths of the transmission lines connecting the land electrodes for the communication ports $P_{IC}$ (RF1) to $P_{IC}$ (RF9) of the switch IC 10 provided on the top surface of the laminated circuit component 11 to the external connection electrodes for communication provided on the bottom surface of the laminated circuit component 11 are the same or substantially the same. With such a configuration, it is possible to obtain the high frequency switch module 1 with a higher degree of freedom in use. In this case, the electrical lengths of all of the transmission lines can be more easily made equal or substantially equal by changing the line widths, as well as by simply changing the line lengths of the internal electrode patterns. Also, in the case of providing the low pass filters 30A and 30B, the electrical lengths of the transmission lines of a reception system or a transmission and reception system which does not include the low pass filters 30A and 30B can be made equal or substantially equal. In this case, it is also possible to improve the degree of freedom in use.

Next, a high frequency switch module according to a second preferred embodiment of the present invention will be described with reference to the drawings.

Figure 4:
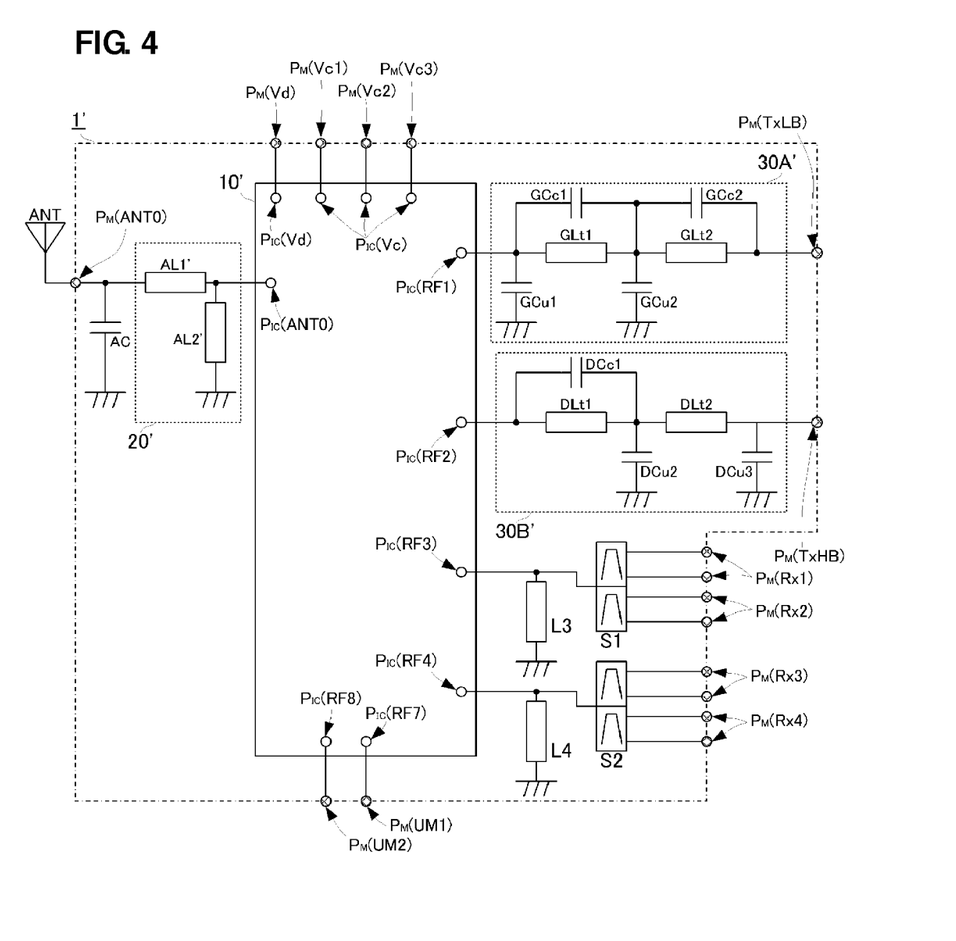
FIG. 4 is a block diagram illustrating a circuit configuration of a high frequency switch module according to a second preferred embodiment of the present invention.

FIG. 4 is a block diagram illustrating a circuit configuration of a high frequency switch module 1'.

Figure 5:
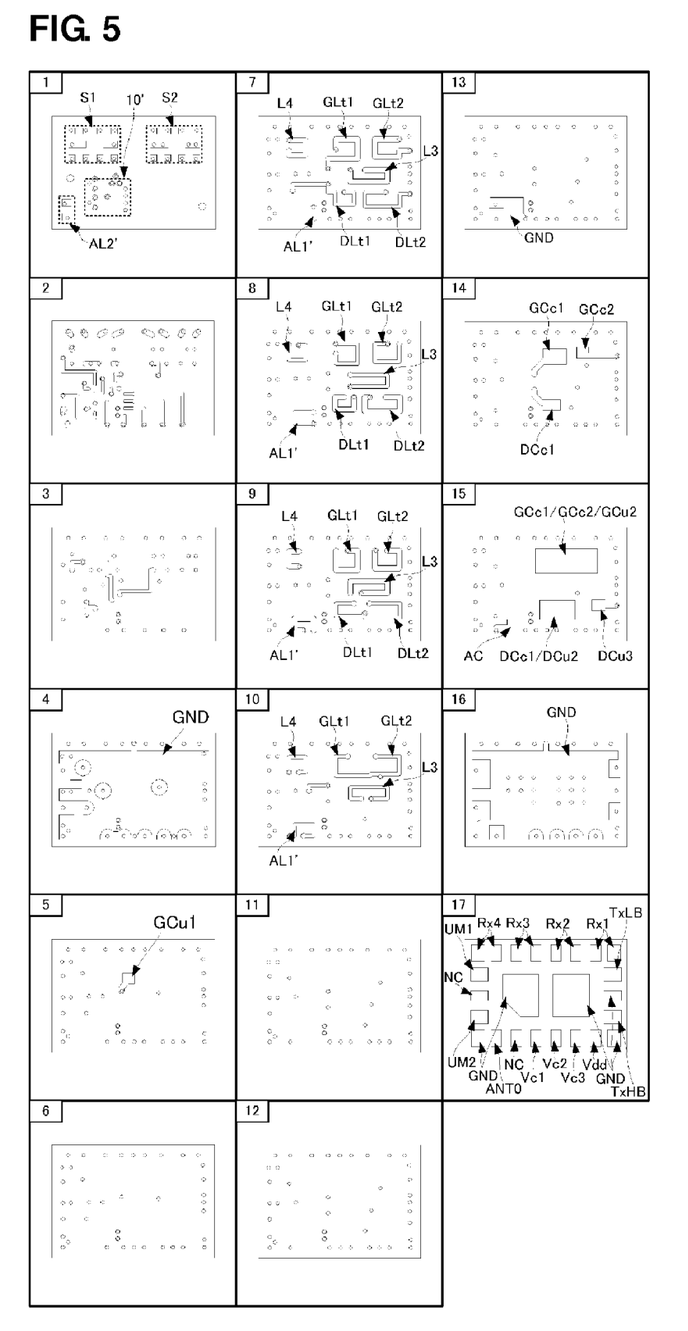
FIG. 5 is a lamination diagram illustrating a laminated circuit component constituting the high frequency switch module according to the second preferred embodiment of the present invention.

FIG. 5 is a lamination diagram illustrating a laminated circuit component constituting the high frequency switch module 1' shown in FIG. 4.

The high frequency switch module 1' according to this preferred embodiment includes a switch IC 10', a phase adjustment circuit 20' including inductors AL1' and AL2', low pass filters 30A' and 30B', an antenna capacitor AC, SAW filters S1 and S2, and matching inductors L3 and L4.

The high frequency switch module 1' is provided with a plurality of external connection electrodes $P_M$. The plurality of external connection electrodes $P_M$ is used to be mounted on a circuit board of a rear end circuit on which the high frequency switch module 1' is mounted. Similar to the first preferred embodiment, in the following description, for convenience of description, the external connection electrodes $P_M$ as the high frequency switch module 1' are called "electrodes", and mounting electrodes $P_{IC}$ of the switch IC 10' are called "ports".

The plurality of external connection electrodes $P_M$ includes an antenna external electrode $P_M$(ANT0) corresponding to an "antenna electrode", transmission external electrodes $P_M$(TxLB) and $P_M$(TxHB) corresponding to a "communication electrode", reception external electrodes $P_M$(Rx1), $P_M$(Rx2), $P_M$(Rx3), and $P_M$(Rx4), transmission and reception external electrodes $P_M$(UM1) and $P_M$(UM2), a driving voltage input external electrode $P_M$(Vd) arranged to input a driving voltage, and control voltage input external electrode $P_M$(Vc1), $P_M$(Vc2), and $P_M$(Vc3) arranged to input a control voltage signal. The reception external electrodes $P_M$(Rx1), $P_M$(Rx2), $P_M$(Rx3), and $P_M$(Rx4) are arranged for parallel output, and they are defined by a set of electrodes.

The antenna external electrode $P_M$(ANT0) connected to an antenna ANT as the high frequency switch module 1' is connected to the antenna port $P_{IC}$ (ANT0) of the switch IC 10' through the phase adjustment circuit 20'.

The phase adjustment circuit 20' includes the inductors AL1' and AL2'. The inductor AL1' corresponding to a "series inductor" is serially connected between the antenna external electrode $P_M$(ANT0) and the antenna port $P_{IC}$ (ANT0). The inductor AL2' corresponding to a "shunt inductor" is connected between the side of the inductor AL1' close to the antenna port $P_{IC}$(ANT0) and the ground. The antenna capacitor AC is connected between the side of the inductor AL1' close to the antenna external electrode $P_M$ (ANT0) and the ground. As described above, the antenna port $P_{IC}$ (ANT0) of the switch IC 10' is connected to the ground through only the inductor AL2' without passing through the other circuit elements, and thus, electric charges accumulated in FETs or condensers provided in the switch IC 10' are discharged to the ground through only the inductor AL2' at the time of switching. With such a configuration, the discharge can be rapidly performed, and it is possible to improve the switching speed. That is, by using the phase adjustment circuit 20' of this preferred embodiment, it is possible to also have a high speed function (corresponding to a function as an ESD protection device) of the switching speed, as well as the phase adjustment function.

The transmission external electrode $P_M$(TxLB) of the high frequency switch module 1' is connected to the communication port $P_{IC}$ (RF1) of the switch IC 10' through the low pass filter 30A'. The low pass filter 30A' has a configuration in which the capacitor GCu3 is removed from the low pass filter 30A described in the first preferred embodiment, for example, a frequency band of the transmission signal of GSM850 or GSM900 is set as the pass band, and a band of a double harmonic and a triple harmonic is set as an attenuation band.

The transmission external electrode $P_M$(TxHB) of the high frequency switch module 1' is connected to the communication port $P_{IC}$ (RF2) of the switch IC 10' through the low pass filter 30B'. The low pass filter 30B' includes inductors DLt1 and DLt2 and capacitors DCu2, DCu3, and DCc1. The low pass filter 30B', in which the capacitor is connected in parallel to the inductor DLt2 is removed from the low pass filter 30B described in the first preferred embodiment, is provided with the capacitor DCc1 connected in parallel to the inductor DLt1. Similar to the low pass filter 30B described in the first preferred embodiment, for example, the frequency band of the transmission signal of GSM1800 or GSM1900 is preferably set as the pass band, and a band of double harmonic and triple harmonic is preferably set as an attenuation band.

The reception external electrodes $P_M$(Rx1) and $P_M$(Rx2) of the high frequency switch module 1' are connected to the SAW filter S1, and the SAW filter S1 is connected to the communication port $P_{IC}$ (RF3) of the switch IC 10'. The SAW filter S1 includes two SAW filters having different pass bands, for example, the SAW filter close to the reception external electrode $P_M$ (Rx1) is set such that the frequency band of the GSM850 reception signal is the pass band, and the SAW filter close to the reception external electrode $P_M$ (Rx2) is set such that the frequency band of the GSM900 reception signal is the pass band.

A predetermined location on the transmission line between the SAW filter S1 and the communication port $P_{IC}$ (RF3) of the switch IC 10' is connected to the ground through the inductor L3. Impedance matching between the communication port $P_{IC}$ (RF3) and the SAW filter S1 is performed by the inductor L3.

The reception external electrodes $P_M$ (Rx3) and $P_M$ (Rx4) of the high frequency switch module 1' are connected to the SAW filter S2, and the SAW filter S2 is connected to the communication port $P_{IC}$ (RF4) of the switch IC 10'. The SAW filter S2 includes two SAW filters having different pass bands, for example, the SAW filter close to the reception external electrode $P_M$ (Rx3) is preferably set such that the frequency band of the GSM1800 reception signal is the pass band, and the SAW filter close to the reception external electrode $P_M$ (Rx4) is preferably set such that the frequency band of the GSM1900 reception signal is the pass band.

A predetermined location on the transmission line between the SAW filter S2 and the communication port $P_{IC}$ (RF4) of the switch IC 10' is connected to the ground through the inductor L4. Impedance matching between the communication port $P_{IC}$ (RF4) and the SAW filter S2 is performed by the inductor L4.

The transmission and reception external electrodes $P_M$ (UM1) and $P_M$ (UM2) of the high frequency switch module 1' are connected to the communication ports $P_{IC}$ (RF7) and $P_{IC}$ (RF8) of the switch IC 10', respectively. The transmission and reception external electrodes $P_M$ (UM1) and $P_M$ (UM2) are connected to a transmission and reception circuit (not shown) for communication signals. For example, the transmission and reception external electrodes $P_M$ (UM1) and $P_M$ (UM2) are connected to a transmission and reception circuit for UMTS or a transmission and reception circuit for WCDMA.

The driving voltage input external electrode $P_M$ (Vd) of the high frequency switch module 1' is connected to the driving voltage input port $P_{IC}$ (Vd) of the switch IC 10'.

The control voltage input external electrodes $P_M$ (Vc1), $P_M$ (Vc2), and $P_M$ (Vc3) of the high frequency switch module 1' are connected to the control voltage input ports $P_{IC}$ (Vc1), $P_{IC}$ (Vc2), and $P_{IC}$ (Vc3) of the switch IC 10', respectively.

The switch IC 10' is an SP6T-type FET switch IC preferably having a substantially rectangular parallelepiped shape, for example, is driven by a driving voltage Vdd, and has a function of selectively connecting any one of the communication ports $P_{IC}$ (RF1) to $P_{IC}$ (RF4), $P_{IC}$ (RF7), and $P_{IC}$ (RF8) corresponding to a "communication circuit terminal", to the antenna port $P_{IC}$ (ANT0) corresponding to a "common terminal", according to the combination of the control voltage signals Vc1 to Vc3.

Similar to the switch IC 10 of the first preferred embodiment, the switch circuits between the antenna ports $P_{IC}$ (ANT0) and the communication ports $P_{IC}$ (RF1) to $P_{IC}$ (RF4), $P_{IC}$ (RF7), and $P_{IC}$ (RF8) of the switch IC 10' have the same or substantially the same structure, and thus, it is possible to obtain the same or substantially the same electrical characteristics even when any one of the communication ports $P_{IC}$ (RF1) to $P_{IC}$ (RF4), $P_{IC}$ (RF7), and $P_{IC}$ (RF8) is selected.

The structure of the high frequency switch module 1' according to this preferred embodiment will be described in detail with reference to FIG. 5.

The laminated circuit component of the high frequency switch module 1' according to this preferred embodiment preferably includes 17 organic layers that are laminated. FIG. 5 is a lamination diagram in which the top surface of the laminated circuit component of the high frequency switch module 1' is the first layer, the layer numbers increase toward the bottom surface, the bottom surface of the laminated circuit component is the seventeenth layer, and the laminated circuit component will be described hereinafter with reference to the layer numbers. In FIG. 5, the single-line circles and two-line circles shown in the layers denote conductive via-holes, and conductivity between the electrodes of the layers arranged in the lamination direction is secured by the via-holes.

The first top surface corresponding to the top surface of the laminated circuit component of the high frequency switch module 1' is provided with a land group arranged to mount the switch IC 10', the SAW filters S1 and S2, and the inductor AL2' as individual discrete components. The inductor AL2' may be defined by electrode patterns in the laminated circuit component, but may also be defined by the individual discrete components to improve current resistance. Accordingly, it is possible to provide characteristics making it more difficult to be destroyed and easier to allow electric current to flow at the time of discharging electric charges in the switch IC 10'.

The second and third layers are provided with various lead electrode patterns.

The fourth layer is provided with a ground electrode GND. The ground electrode GND of the fourth electrode also functions as an opposite electrode of the capacitor GCu1. The fifth layer is provided with an opposite electrode of the capacitor GCu1. The sixth layer is provided with only via-holes.

The seventh, eighth, and ninth layers are provided with electrode patterns defining the inductors GLt1, GLt2, DLt1, DLt2, L3, L4, and AL1', and the tenth layer is provided with electrode patterns defining the inductors GLt1, GLt2, L3, L4, and AL1'.

The eleventh and twelfth layers are provided with only via-holes. The thirteenth layer is provided with a ground electrode GND.

The fourteenth layer is provided with opposite electrodes of the capacitors GCc1, GCc2, and DCc1. The fifteenth layer is provided with an opposite electrode of the capacitors GCc1, GCc2, and GCu2, an opposite electrode of the capacitors DCc1 and DCu2, and opposite electrodes of the capacitors DCu1 and AC.

The sixteenth layer is provided with a ground electrode GND. The ground electrode GND of the sixteenth layer also functions as an opposite electrode of the capacitors GCc1, GCc2, GCu2, DCc1, DCu2, DCu3, and AC.

The bottom surface of the seventeenth layer corresponding to the bottom surface of the laminated circuit component of the high frequency switch module 1' is provided with the external connection electrodes $P_M$. In this case, the transmission external electrodes $P_M$ (TxLB) and PM (TxHB) are arranged along one side of the laminated body, the reception external electrodes $P_M$ (Rx1), $P_M$ (Rx2), $P_M$ (Rx3), and $P_M$ (Rx4) are arranged along another side of the laminated body, the transmission and reception external electrodes $P_M$ (UM1) and $P_M$ (UM2) are arranged along still another side of the laminated body, and the driving voltage input external electrode $P_M$ (Vd) and the control voltage input external electrodes $P_M$ (Vc1), $P_M$ (Vc2), and $P_M$ (Vc3) are arranged along the remaining other side. That is, the transmission electrode group, the reception electrode group, the transmission and reception electrode group, and the control electrode group are arranged along different sides of the laminated body to one another. The ground electrode is arranged in a central area surrounded by the electrode groups. With such a configuration, it is possible to improve the isolation among the groups.

With such a configuration, the same operation and effects as those of the first preferred embodiment can be obtained.

The connection combination of the communication ports $P_{IC}$ of the switch ICs 10 and 10', the transmission external electrodes, the reception external electrodes, and the transmission and reception external electrodes $P_M$ of the high frequency switch modules 1 and 1' is an example, and another connection configuration may be employed. For example, FIG. 6 is a diagram for explaining the connection relationship between the communication ports of the switch IC 10 and the external electrodes of the laminated circuit component.

Figure 6:
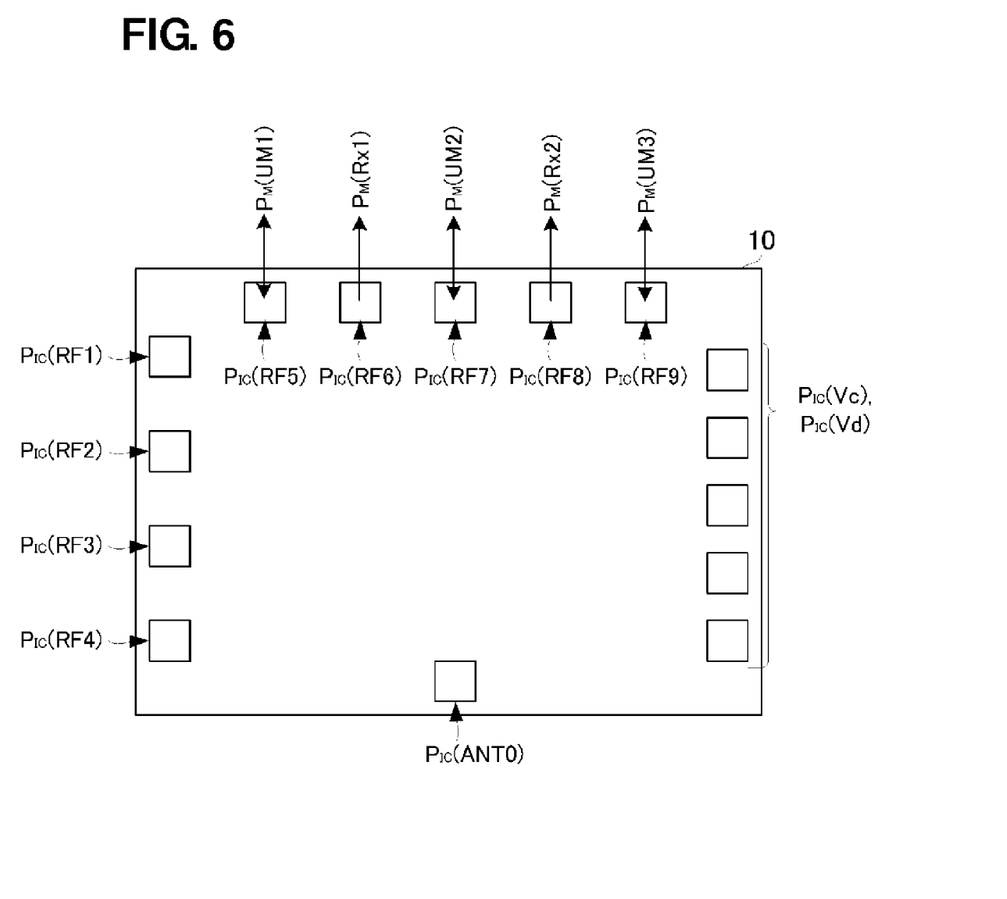
FIG. 6 is a diagram for explaining connection relationship between communication ports of the switch IC and external electrodes of the laminated circuit component.

As shown in FIG. 6, the communication ports $P_{IC}$ (RF5), $P_{IC}$ (RF6). $P_{IC}$ (RF7). $P_{IC}$ (RF8), and $P_{IC}$ (RF9) arranged along one side of the switch IC 10 are connected as follows.

The communication port $P_{IC}$ (RF5) of the switch IC 10 is connected to the transmission and reception external electrode $P_M$ (UM1). The communication port $P_{IC}$ (RF6) of the switch IC 10 is connected to the reception external electrode $P_M$ (Rx1). The communication port $P_{IC}$ (RF7) of the switch IC 10 is connected to the transmission and reception external electrode $P_M$ (UM2). The communication port $P_{IC}$ (RF8) of the switch IC 10 is connected to the reception external electrode $P_M$ (Rx2). The communication port $P_{IC}$ (RF9) of the switch IC 10 is connected to the transmission and reception external electrode $P_M$ (UM3).

With this configuration, the communication ports $P_{IC}$ (RF6) and $P_{IC}$ (RF8) connected to the reception external electrodes $P_M$ (Rx1) and $P_M$ (Rx2) are provided between the communication ports $P_{IC}$ (RF5), $P_{IC}$ (RF7), and $P_{IC}$ (RF9) connected to the transmission and reception external electrodes $P_M$ (UM1), $P_M$ (UM2), and $P_M$ (UM3). In other words, the communication ports connected to the transmission and reception external electrodes and the communication ports connected to the reception external electrodes are alternately provided in the arrangement direction. Accordingly, the communication ports used for transmission and reception of the switch IC 10 are not adjacent to one another, and the circuit patterns connected to the communication ports of the laminated circuit component are not adjacent to one another. Therefore, it is possible to improve the isolation among the communication ports used for transmission and reception of the switch IC 10, and among the circuit patterns connected to the communication ports of the laminated circuit component.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A high frequency switch module comprising:
   a laminated circuit component including an antenna electrode connected to a single antenna, a plurality of communication electrodes connected to a plurality of high frequency communication circuits to transmit, receive, or transmit and receive a plurality of kinds of communication signals, and a land arranged to mount a switch IC thereon; and
   a switch IC mounted on the laminated circuit component and including a common terminal connected to the single antenna through the laminated circuit component and a plurality of communication circuit terminals connected to the plurality of high frequency communication circuits through the laminated circuit component; wherein
   the switch IC includes switch circuits arranged between the plurality of communication circuit terminals and the common terminal, and all of the switch circuits have the same or substantially the same resistance against transmission power that is applied at the time of transmission; and
   all of the switch circuits have the same structure so as to provide the same electrical characteristics when any of the plurality of communication circuit terminals is selected.

2. The high frequency switch module according to claim 1, wherein the switch circuits of the switch IC include semiconductor switch elements connected to a plurality of stages, and numbers of stages of the semiconductor switch elements of all of the switch circuits are the same.

3. The high frequency switch module according to claim 1, wherein the plurality of communication circuit terminals including a plurality of transmission and reception terminals and reception-only terminals are arranged at an outside edge on one main surface of the switch IC, and the plurality of transmission and reception terminals and the reception-only terminals are alternately arranged.

4. The high frequency switch module according to claim 1, wherein the laminated circuit component includes a phase adjustment circuit including an inductor defined by discrete components mounted on the laminated circuit component or electrode patterns disposed between laminated insulating layers, and the phase adjustment circuit is arranged between the antenna electrode and the common terminal.

5. The high frequency switch module according to claim 1, further comprising an inductor including one end connected to the common terminal and the other end connected to a ground electrode.

6. The high frequency switch module according to claim 4, wherein the inductor defining the phase adjustment circuit includes a series inductor serially connected between the antenna electrode and the common terminal and a shunt inductor including one end connected to the common terminal on the common terminal side of the series inductor and the other end connected to the ground electrode.

7. The high frequency switch module according to claim 1, wherein the switch IC is defined by a substantially rectangular parallelepiped member which is substantially rectangular in plan view, and the plurality of communication circuit terminals are arranged closer to one side other than a side on which the common terminal of the switch IC is provided.

8. The high frequency switch module according to claim 7, wherein the switch IC includes a driving power supply terminal arranged to supply electric power, and the driving power supply terminal is arranged closer to one side other than the side on which the plurality of communication circuit terminals of the switch IC are provided.

9. The high frequency switch module according to claim 1, wherein the laminated circuit component includes a plurality of connection circuits that electrically connect the plurality of communication circuit terminals of the switch IC to the plurality of communication electrodes to be connected to the plurality of communication circuit terminals by a via-hole extending through the insulating layers and the circuit electrode patterns each provided between the laminated insulating layers, and the plurality of connection circuits are arranged to have the same or substantially the same electrical length.

10. The high frequency switch module according to claim 1, wherein the laminated circuit component includes a plurality of connection circuits that electrically connect the plurality of communication circuit terminals of the switch IC to the plurality of communication electrodes to be connected to the plurality of communication circuit terminals by a via-hole extending through the insulating layers and the circuit electrode patterns each provided between the laminated insulating layers, a filter circuit with a predetermined pass band is disposed in a specific connection circuit of the plurality of connection circuits, and the filter circuit includes an inductor and a capacitor defined by electrode patterns provided between the laminated insulating layers or by discrete components mounted on the laminated circuit component.

* * * * *